United States Patent
Mekid

(10) Patent No.: US 8,897,477 B1
(45) Date of Patent: Nov. 25, 2014

(54) DUAL RESONATOR CHAMBER WITH VARIABLE VOLUME

(71) Applicant: King Fahd University of Petroleum and Minerals, Dhahran (SA)

(72) Inventor: Samir Mekid, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 71 days.

(21) Appl. No.: 13/898,430

(22) Filed: May 20, 2013

(51) Int. Cl.
*H04R 25/00* (2006.01)
*F15B 1/02* (2006.01)

(52) U.S. Cl.
CPC .................................. *F15B 1/021* (2013.01)
USPC ........................... 381/353; 381/345; 181/226

(58) Field of Classification Search
CPC ........... F01N 1/02; F01N 1/023; F01N 1/165; F01N 1/16; F02M 35/1216; F02M 35/1266; F02M 35/1222; F02M 35/1261; H04R 1/2807; H04R 1/2819; H04R 2499/11; H04R 1/227; H04R 1/2842; H04R 1/2849; H04R 1/2857; H04R 1/2888; H04R 1/345
USPC ......... 381/338, 337, 345, 346, 351, 353, 354, 381/73.1, 71.7, 71.1; 181/182, 183, 184, 181/185, 175, 189, 224, 226, 219, 222, 241, 181/249, 277
See application file for complete search history.

(56) References Cited

U.S. PATENT DOCUMENTS

| | | | |
|---|---|---|---|
| 4,539,947 A | 9/1985 | Sawada et al. | |
| 5,283,398 A | 2/1994 | Kotera et al. | |
| 5,475,189 A | 12/1995 | Field et al. | |
| 5,921,081 A | 7/1999 | Kim | |
| 6,158,546 A * | 12/2000 | Hanson et al. | 181/255 |
| 6,752,240 B1 * | 6/2004 | Schlagenhaft | 181/249 |
| 2005/0199439 A1 | 9/2005 | Goenka et al. | |
| 2005/0252716 A1 | 11/2005 | Moenssen et al. | |

FOREIGN PATENT DOCUMENTS

DE 101 43 686 A1 3/2003

* cited by examiner

Primary Examiner — Davetta W Goins
Assistant Examiner — Phylesha Dabney
(74) Attorney, Agent, or Firm — Richard C. Litman

(57) ABSTRACT

The dual resonator chamber with variable volume includes first and second housings. The second housing is slidably mounted within the first housing such that a second inner neck portion of the second housing is slidably mounted about the first inner neck portion of the first housing and forms a fluid-tight seal therewith. A sliding wall is slidably mounted within the second housing, dividing the interior thereof into upper and lower resonator chambers. At least one first actuator selectively adjusts the height of the sliding wall with respect to the second lower end of the second housing to selectively adjust volumes of the upper and lower resonator chambers. At least one second actuator selectively adjusts the height of the second housing with respect to the first housing to selectively adjust the neck length of the lower resonator chamber.

20 Claims, 1 Drawing Sheet

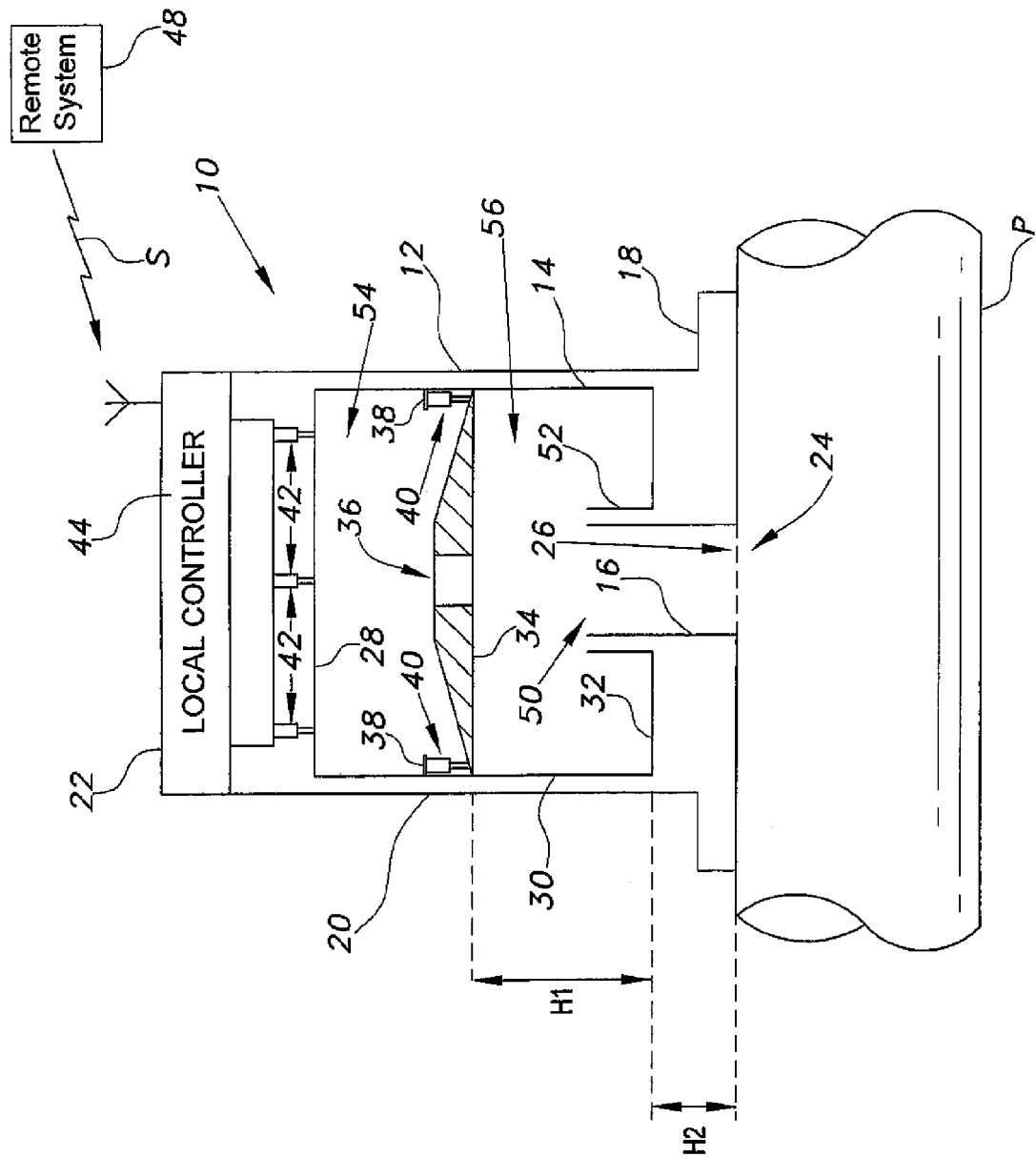

DUAL RESONATOR CHAMBER WITH VARIABLE VOLUME

BACKGROUND OF THE INVENTION

1. Field of the Invention

The present invention relates generally to noise reduction devices, and particularly to a dual resonator chamber with variable volume for reducing noise in pipelines.

2. Description of the Related Art

Excessive noise caused by compressors and the like in oil refineries and other industries involving pressurized flow through pipelines can cause distress to the personnel working in such refineries and the like. In addition to physical discomfort, the high noise level can mask emergency alarms and the like, thus creating a hazard in the workplace. Typical noise levels under such conditions may fall in the range of between 70 and 120 dB.

In order to prevent work stoppage due to such noise levels (which tends to increase over the lifetime of the machinery), Helmholtz resonators are often applied to pipes. However, such resonators are typically not tunable, thus requiring replacement of the individual resonators when the flow in the pipes is varied.

Thus, a dual resonator chamber with variable volume solving the aforementioned problems is desired.

SUMMARY OF THE INVENTION

The dual resonator chamber with variable volume is a noise-reducing chamber for use with pipelines or the like. The dual resonator chamber with variable volume includes a first housing having a first upper wall, at least one first sidewall, and a first lower end. The first lower end is adapted for mounting on a support surface, such as a pipe or the like, and has a first opening formed therethrough. A first inner neck portion is internally mounted on the first lower end about the first opening and projects upwardly therefrom. A second housing has a second upper wall, at least one second sidewall, and a second lower end. The second lower end has a second opening formed therethrough. A second inner neck portion is internally mounted on the second lower end about the second opening and projects upwardly therefrom. The second housing is slidably mounted within the first housing such that the second inner neck portion of the second housing is slidably mounted about the first inner neck portion of the first housing and forms a fluid-tight seal therewith.

A sliding wall is slidably mounted within the second housing. The sliding wall divides the interior of the second housing into upper and lower resonator chambers. The sliding wall has a passage formed therethrough, and a perimeter of the sliding wall contacts an inner surface of the second sidewall of the second housing to form a fluid-tight seal therewith.

At least one first actuator selectively adjusts the height of the sliding wall with respect to the second lower end of the second housing to selectively adjust volumes of the upper and lower resonator chambers. At least one second actuator is further provided for selectively adjusting the height of the second lower end of the second housing with respect to the first lower end of the first housing to selectively adjust the neck length of the lower resonator chamber. The at least one first actuator and the at least one second actuator may be remotely controlled.

These and other features of the present invention will become readily apparent upon further review of the following specification.

BRIEF DESCRIPTION OF THE DRAWINGS

The sole drawing FIGURE is a diagrammatic side view in section of a dual resonator chamber with variable volume according to the present invention.

DETAILED DESCRIPTION OF THE PREFERRED EMBODIMENTS

The dual resonator chamber with variable volume 10 is a noise-reducing chamber for use with pipelines or the like. The sole drawing FIGURE illustrates the dual resonator chamber 10 mounted on an exemplary pipe P. The dual resonator chamber 10 includes a first housing 12 having a first upper wall 22, at least one first sidewall 20 and a first lower end 18. The sole drawing FIGURE diagrammatically shows the first housing 12 being a substantially cylindrical, although it should be understood that the first housing 12 may have any desired shape. The first lower end 18 is adapted for mounting on a support surface, such as the outer surface of the exemplary pipe P or the like, and has a first opening 26 formed therethrough. As shown, the first opening 26 is preferably formed substantially centrally with respect to the first lower end 18. A first inner neck portion 16 is internally mounted on the first lower end 18 about the first opening 26 and projects upwardly therefrom. As shown, the first opening 26 is aligned with an opening 24 formed through the pipe P.

A second housing 14 is further provided. The second housing 14 has a second upper wall 28, at least one second sidewall 30 and a second lower end 32. The sole drawing FIGURE diagrammatically shows the second housing 14 being substantially cylindrical, although it should be understood that the second housing 14 may have any desired shape. The second lower end 32 has a second opening 50 formed therethrough. As shown, the second opening 50 is preferably formed substantially centrally with respect to the second lower end 32. A second inner neck portion 52 is internally mounted on the second lower end 32 about the second opening 50 and projects upwardly therefrom. The second housing 14 is slidably mounted within the first housing 12 such that the second inner neck portion 52 of the second housing 14 is slidably mounted about the first inner neck portion 16 of the first housing 12 and forms a fluid-tight seal therewith.

A sliding wall 34 is slidably mounted within the second housing 14. In the sole drawing FIGURE, the sliding wall 34 is shown as having a substantially trapezoidal cross-sectional configuration, although it should be understood that the sliding wall 34 may have any desired shape. The sliding wall 34 divides the interior of the second housing 14 into upper and lower resonator chambers 54, 56, respectively. The sliding wall 34 has a passage 36 formed therethrough, forming a neck portion between the upper and lower resonator chambers 54, 56. As shown, the perimeter of the sliding wall 34 contacts the inner surface of the second sidewall 30 of the second housing 14 to form a fluid-tight seal therewith. As shown, the passage 36 is preferably formed substantially centrally with respect to the sliding wall 34.

At least one first actuator 40 selectively adjusts the height H1 of the sliding wall 34 with respect to the second lower end 32 of the second housing 14 to selectively adjust the volumes of the upper and lower resonator chambers 54, 56, respectively. Similarly, at least one second actuator 42 is further provided for selectively adjusting the height H2 of the second lower end 32 of the second housing 14 with respect to the first lower end 18 of the first housing 12 to selectively adjust the neck length of the lower resonator chamber 56.

In the sole drawing FIGURE, the actuators 40 are shown as being pneumatic cylinders secured by brackets 38 to the inner surface of the second sidewall 30. It should be understood that the pneumatic cylinders are shown for exemplary purposes only, and that any suitable type of actuator, such as a linear actuator or the like, or any other suitable type of motor, gear system, drive or the like may be utilized for selectively and adjustably controlling the height H1 of the sliding wall 34. Similarly, in the sole drawing FIGURE, the actuators 42 are shown as being pneumatic cylinders secured between the first upper wall 22 and the second upper wall 28. It should be understood that the pneumatic cylinders are shown for exemplary purposes only, and that any suitable type of actuator, such as a linear actuator or the like, or any other suitable type of motor, gear system, drive or the like may be utilized for selectively and adjustably controlling the height H2 of the lower end 32 of the second housing 14.

The at least one first actuator 40 and the at least one second actuator 42 may be controlled locally by a local controller 44, which may be any suitable type of controller, such as that associated with a computer, a programmable logic controller or the like. Alternatively, the at least one first actuator 40 and the at least one second actuator 42 may be remotely controlled by wired or wireless signals S transmitted by a remote system 48 and received by an antenna, a transponder or the like associated with the local controller 44.

When used in combination with a pipeline in particular, the dual resonator 10 is used for noise reduction. The volumes of the upper and lower resonator chambers 54, 56 are controllably adjusted in response to the passing blade frequency associated with the pipe P and/or acoustic power associated with flow through pipe P.

It is to be understood that the present invention is not limited to the embodiments described above, but encompasses any and all embodiments within the scope of the following claims.

I claim:

1. A dual resonator chamber with variable volume, comprising:
    a first housing having a first upper wall, at least one first sidewall and a first lower end, the first lower end being adapted for mounting on a support surface and having a first opening formed therethrough, the first housing having a first inner neck portion internally mounted on the first lower end about the first opening and projecting upwardly therefrom, the first housing being hollow and having an interior;
    a second housing having a second upper wall, at least one second sidewall and a second lower end, the second lower end having a second opening formed therethrough, the second housing having a second inner neck portion internally mounted on the second lower end about the second opening and projecting upwardly therefrom, the second housing being slidably mounted within the first housing such that the second inner neck portion of the second housing is slidably mounted about the first inner neck portion of the first housing, the second housing being hollow and having an interior;
    a sliding wall slidably mounted within the second housing, the sliding wall dividing the interior of the second housing into upper and lower resonator chambers, the sliding wall having a passage formed therethrough;
    means for selectively adjusting the height of the sliding wall with respect to the second lower end of the second housing to selectively adjust volumes of the upper and lower resonator chambers; and
    means for selectively adjusting the height of the second lower end of the second housing with respect to the first lower end of the first housing to selectively adjust a neck length of the lower resonator chamber.

2. The dual resonator chamber with variable volume as recited in claim 1, wherein the first opening is positioned substantially centrally with respect to the first lower end of said first housing.

3. The dual resonator chamber with variable volume as recited in claim 2, wherein the second opening is positioned substantially centrally with respect to the second lower end of said second housing.

4. The dual resonator chamber with variable volume as recited in claim 3, wherein the passage formed through said sliding wall is positioned substantially centrally with respect thereto.

5. The dual resonator chamber with variable volume as recited in claim 4, wherein the second inner neck portion of said second housing is slidably mounted about the first inner neck portion of said first housing to form a fluid-tight seal therebetween.

6. The dual resonator chamber with variable volume as recited in claim 5, wherein said sliding wall has a perimeter contacting an inner surface of the second sidewall of said second housing to form a fluid-tight seal therebetween.

7. The dual resonator chamber with variable volume as recited in claim 1, wherein said means for selectively adjusting the height of said sliding wall with respect to the second lower end of said second housing comprises at least one first actuator secured between an inner surface of the second sidewall of said second housing and said sliding wall.

8. The dual resonator chamber with variable volume as recited in claim 7, wherein said means for selectively adjusting the height of the second lower end of said second housing with respect to the first lower end of said first housing comprises at least one second actuator secured between an inner face of the first upper wall and an outer face of the second upper wall.

9. The dual resonator chamber with variable volume as recited in claim 8, wherein said at least one first actuator and said at least one second actuator are remotely controlled.

10. A dual resonator chamber with variable volume, comprising:
    a first housing having a first upper wall, at least one first sidewall and a first lower end, the first lower end being adapted for mounting on a support surface and having a first opening formed therethrough, the first housing having a first inner neck portion internally mounted on the first lower end about the first opening and projecting upwardly therefrom, the first housing being hollow and having an interior;
    a second housing having a second upper wall, at least one second sidewall and a second lower end, the second lower end having a second opening formed therethrough, the second housing having a second inner neck portion internally mounted on the second lower end about the second opening and projecting upwardly therefrom, the second housing being hollow and having an interior, the second housing being slidably mounted within the first housing such that the second inner neck portion of the second housing is slidably mounted about the first inner neck portion of the first housing;
    a sliding wall slidably mounted within the second housing, the sliding wall dividing the interior of the second housing into upper and lower resonator chambers, the sliding wall having a passage formed therethrough;

at least one first actuator disposed in the second housing for selectively adjusting the height of the sliding wall with respect to the second lower end of the second housing to selectively adjust volumes of the upper and lower resonator chambers; and at least one second actuator disposed in the first housing for selectively adjusting the height of the second lower end of the second housing with respect to the first lower end of said first housing to selectively adjust a neck length of the lower resonator chamber.

11. The dual resonator chamber with variable volume as recited in claim 10, wherein the first opening is positioned substantially centrally with respect to the first lower end of said first housing.

12. The dual resonator chamber with variable volume as recited in claim 11, wherein the second opening is positioned substantially centrally with respect to the second lower end of said second housing.

13. The dual resonator chamber with variable volume as recited in claim 12, wherein the passage formed through said sliding wall is positioned substantially centrally with respect thereto.

14. The dual resonator chamber with variable volume as recited in claim 13, wherein the second inner neck portion of said second housing is slidably mounted about the first inner neck portion of said first housing to form a fluid-tight seal therebetween.

15. The dual resonator chamber with variable volume as recited in claim 14, wherein said sliding wall has a perimeter contacting an inner surface of the second sidewall of said second housing to form a fluid-tight seal therebetween.

16. The dual resonator chamber with variable volume as recited in claim 10, wherein said at least one first actuator and said at least one second actuator are remotely controlled.

17. A dual resonator chamber with variable volume, comprising:

a first housing having a first upper wall, at least one first sidewall and a first lower end, the first lower end being adapted for mounting on a support surface and having a first opening formed therethrough, the first housing having a first inner neck portion internally mounted on the first lower end about the first opening and projecting upwardly therefrom, the first housing being hollow and having an interior;

a second housing having a second upper wall, at least one second sidewall and a second lower end, the second lower end having a second opening formed therethrough, the second housing having a second inner neck portion internally mounted on the second lower end about the second opening and projecting upwardly therefrom, the second housing being hollow and having an interior, the second housing being slidably mounted within the first housing such that the second inner neck portion of the second housing is slidably mounted about the first inner neck portion of the first housing;

a sliding wall slidably mounted within said second housing, the sliding wall dividing the interior of the second housing into upper and lower resonator chambers, the sliding wall having a passage formed therethrough;

at least one first actuator disposed in the second housing for selectively adjusting the height of the sliding wall with respect to the second lower end of the second housing to selectively adjust volumes of the upper and lower resonator chambers; and at least one second actuator disposed in the first housing for selectively adjusting the height of the second lower end of the second housing with respect to the first lower end of the first housing to selectively adjust a neck length of the lower resonator chamber, wherein the at least one first actuator and the at least one second actuator are remotely controlled.

18. The dual resonator chamber with variable volume as recited in claim 17, wherein the first opening is positioned substantially centrally with respect to the first lower end of said first housing.

19. The dual resonator chamber with variable volume as recited in claim 18, wherein the second opening is positioned substantially centrally with respect to the second lower end of said second housing.

20. The dual resonator chamber with variable volume as recited in claim 19, wherein the passage formed through said sliding wall is positioned substantially centrally with respect thereto.

* * * * *